United States Patent
Suzuki (10) Patent No.: US 9,325,190 B2
(45) Date of Patent: *Apr. 26, 2016

(54) POWER STORAGE SYSTEM HAVING CURRENT LIMITING MEANS TO CONTROL MULTIPLE PARALLEL CONNECTED BATTERY PACKS

(75) Inventor: Shin Suzuki, Sagamihara (JP)

(73) Assignee: NEC ENERGY DEVICES, LTD, Kanagawa (JP)

( * ) Notice: Subject to any disclaimer, the term of this patent is extended or adjusted under 35 U.S.C. 154(b) by 435 days.

This patent is subject to a terminal disclaimer.

(21) Appl. No.: 13/811,720

(22) PCT Filed: May 30, 2011

(86) PCT No.: PCT/JP2011/062379
§ 371 (c)(1),
(2), (4) Date: Jan. 23, 2013

(87) PCT Pub. No.: WO2012/017728
PCT Pub. Date: Feb. 9, 2012

(65) Prior Publication Data

US 2013/0119934 A1    May 16, 2013

(30) Foreign Application Priority Data

Aug. 2, 2010   (JP) ................. 2010-173463

(51) Int. Cl.
*H02J 7/00* (2006.01)
*H01M 10/44* (2006.01)
(Continued)

(52) U.S. Cl.
CPC ............... *H02J 7/007* (2013.01); *B60L 3/0046* (2013.01); *B60L 11/1853* (2013.01);
(Continued)

(58) Field of Classification Search
CPC ............ B60L 11/1853; B60L 11/1859; B60L 11/1862; B60L 11/1866; B60L 11/1877; B60L 3/0046; B60L 2240/547; B60L 2240/549; H02J 7/0016; H02J 7/0031; H02J 7/007; H01M 10/441; H01M 10/052; H01M 2010/4271; Y02T 10/7055; Y02T 10/7011; Y02T 10/7044; Y02T 10/7005; Y02T 10/7061
See application file for complete search history.

(56) References Cited

U.S. PATENT DOCUMENTS 5,216,349 A * 6/1993 Kanouda et al. ............ 318/805
5,646,503 A * 7/1997 Stockstad .................... 320/135
(Continued)

FOREIGN PATENT DOCUMENTS

CN   1246184 A   3/2000
CN   1674402 A   9/2005
(Continued)

OTHER PUBLICATIONS

Communication dated Sep. 12, 2014 from The State Intellectual Property Office of the People's Republic of China in counterpart Chinese Patent Application No. 201180037989.8.
(Continued)

*Primary Examiner* — Naum B Levin
(74) *Attorney, Agent, or Firm* — Sughrue Mion, PLLC (57) ABSTRACT

A power storage system has a plurality of secondary battery packs and a host device. The secondary battery packs each have: secondary batteries; a charge switch means that turns a charging path to the secondary batteries ON and OFF; a discharge switch means that turns a discharging path from the secondary battery ON and OFF; and a current-limiting means that causes the secondary battery to discharge while limiting the current to, or below, a fixed value. When switching from the secondary battery pack connected to the input/output terminals of the system to a first secondary battery pack in which voltage is higher than in the second secondary battery pack, the host device causes the charge switch means of the second secondary battery pack to turn OFF the charging path while in a state in which the current limiting means of the first secondary battery pack will cause a discharge operation to begin while limiting the flow of current.

17 Claims, 5 Drawing Sheets

(51) Int. Cl.
    *B60L 11/18*       (2006.01)
    *B60L 3/00*        (2006.01)
    *H01M 10/052*    (2010.01)
    *H01M 10/42*     (2006.01)

(52) U.S. Cl.
    CPC ........ *B60L 11/1859* (2013.01); *B60L 11/1862* (2013.01); *B60L 11/1866* (2013.01); *B60L 11/1877* (2013.01); *H01M 10/441* (2013.01); *H02J 7/0016* (2013.01); *H02J 7/0031* (2013.01); *B60L 2240/547* (2013.01); *B60L 2240/549* (2013.01); *H01M 10/052* (2013.01); *H01M 2010/4271* (2013.01); *Y02T 10/7005* (2013.01); *Y02T 10/7011* (2013.01); *Y02T 10/7044* (2013.01); *Y02T 10/7055* (2013.01); *Y02T 10/7061* (2013.01)

(56) References Cited

U.S. PATENT DOCUMENTS

| | | | | |
|---|---|---|---|---|
| 5,801,514 | A | * | 9/1998 | Saeki et al. ................. 320/136 |
| 5,831,350 | A | * | 11/1998 | McConkey et al. ........... 307/150 |
| 5,867,007 | A | * | 2/1999 | Kim ............................. 320/118 |
| 5,886,502 | A | * | 3/1999 | Higashijima ................. 320/118 |
| 6,028,415 | A | * | 2/2000 | Nagai et al. .................. 320/162 |
| 6,545,513 | B2 | * | 4/2003 | Tsuchida et al. ............. 327/108 |
| 6,642,694 | B2 | * | 11/2003 | Yamanaka et al. ........... 320/134 |
| 6,700,350 | B2 | * | 3/2004 | Formenti et al. ............. 320/119 |
| 6,947,514 | B1 | * | 9/2005 | Kato et al. .................... 375/376 |
| 7,081,737 | B2 | * | 7/2006 | Liu et al. ...................... 320/130 |
| 7,173,397 | B2 | * | 2/2007 | Kinoshita et al. ............. 320/134 |
| 7,193,392 | B2 | * | 3/2007 | King et al. .................... 320/118 |
| 7,199,556 | B1 | * | 4/2007 | Benckenstein et al. ....... 320/119 |
| 7,342,381 | B2 | * | 3/2008 | Johnson et al. ............... 320/136 |
| 7,417,405 | B2 | * | 8/2008 | Carrier et al. ................. 320/116 |
| 7,710,080 | B2 | * | 5/2010 | Kobayashi et al. ........... 320/166 |
| 7,911,179 | B2 | * | 3/2011 | Nakanishi ..................... 320/118 |
| 7,990,154 | B2 | * | 8/2011 | Ohnuki ......................... 324/426 |
| 8,134,337 | B2 | * | 3/2012 | Morita .......................... 320/118 |
| 8,264,204 | B2 | * | 9/2012 | Nagaoka et al. .............. 320/136 |
| 8,384,351 | B2 | * | 2/2013 | Monden ................ H02J 7/0026 320/116 |
| 2005/0212484 | A1 | | 9/2005 | Denning et al. |
| 2007/0182247 | A1 | * | 8/2007 | Kim et al. ..................... 307/10.1 |
| 2007/0188138 | A1 | * | 8/2007 | Kobayashi ............ H02J 7/0014 320/119 |
| 2009/0261782 | A1 | * | 10/2009 | Morita .......................... 320/118 |
| 2010/0188051 | A1 | * | 7/2010 | Yamazaki et al. ............ 320/148 |
| 2015/0035494 | A1 | * | 2/2015 | Suzuki .......................... 320/134 |

FOREIGN PATENT DOCUMENTS

| | | |
|---|---|---|
| JP | 7-322527 A | 12/1995 |
| JP | 2002-10517 A | 1/2002 |
| JP | 2005-278395 A | 10/2005 |
| JP | 2008-263718 A | 10/2008 |
| JP | 2009-33936 A | 2/2009 |
| JP | 2010119256 A | 5/2010 |

OTHER PUBLICATIONS

Office Action dated May 20, 2014, issued by the Japan Patent Office in corresponding Japanese Application No. 2010-173463.

\* cited by examiner

POWER STORAGE SYSTEM HAVING CURRENT LIMITING MEANS TO CONTROL MULTIPLE PARALLEL CONNECTED BATTERY PACKS

CROSS REFERENCE TO RELATED APPLICATIONS

This application is a National Stage of International Application No. PCT/JP2011/062379 filed May 30, 2011, claiming priority based on Japanese Patent Application No. 2010-173463 filed Aug. 2, 2010, the contents of all of which are incorporated herein by reference in their entirety.

TECHNICAL FIELD

The present invention relates to a power storage system that has a plurality of secondary battery packs.

BACKGROUND ART

With the increasing importance of environmental problems in recent years, the use of lithium-ion secondary batteries for use in electric vehicles (EV) and hybrid electric vehicles (HEV) in power storage systems that store surplus power realized by PV (Photovoltaic) generation is being investigated. In addition, lithium-ion secondary batteries are also receiving attention as an effective countermeasure against the type of environmental problems that arise from lead storage batteries.

Power storage systems of this type include a configuration in which a plurality of secondary battery packs made up by secondary batteries are arranged in parallel. However, when the plurality of secondary battery packs are arranged in parallel, the potential exists for a high current, that will flow to charge secondary batteries, to cause an accident. As a result, measures are taken to deal with current that is generated by voltage difference among the secondary battery packs, and the heat that is generated due to the flow of current in this secondary battery pack configuration, by either connecting each secondary battery pack to a load, or by disconnecting each secondary battery pack from the load (see Patent Document 1).

The power storage system described in Patent Document 1 is provided with a plurality of storage element rows arranged in parallel and performs an operation to connect the storage element row to a load on the condition that the voltage difference of the storage element row be within a predetermined range of values, whereby overcurrent or abnormal heat caused by voltage differences can be prevented.

LITERATURE OF THE PRIOR ART

Patent Documents

Patent Document 1: Japanese Unexamined Patent Application Publication No. 2009-033936

SUMMARY OF THE INVENTION

Problem to be Solved by the Invention

Nevertheless, in the power storage system described in Patent Document 1, because the storage element row cannot be connected to a load unless the voltage difference of the storage element row is within a predetermined range of values, the operation for controlling the electrical connections among secondary battery packs is limited and flexible operation of the system is therefore not possible. For example, if the capacity of the storage element row that is connected to load and that is caused to discharge should decrease, it will become difficult to perform an operation for switching to another storage element row whose capacity is greater.

It is an object of the present invention to provide a technique that increases the freedom of operation ? as regarding connecting secondary battery packs in a power storage system that has a configuration in which a plurality of secondary battery packs are connected in parallel.

Means for Solving the Problem

To achieve the above-described object, the secondary battery pack connection control method of the present invention is a method to control secondary battery pack electrical connections in order to control the input and output terminals of the secondary batteries in a power storage system provided with a plurality of secondary battery packs, the method including steps of:

starting discharge while controlling current from a first secondary battery pack that is to be newly connected; and turning OFF the charging path of a second secondary battery pack having lower voltage than the first secondary battery pack and that is to be cut off.

The power storage system of the present invention includes:

a plurality of secondary battery packs each having: a secondary battery; charge switch means that turns a charging path to the secondary battery ON and OFF; discharge switch means that turns a discharging path from the secondary battery ON and OFF; and current-limiting means that causes the secondary battery to discharge while limiting current to a fixed value or lower; a host device that, when switching the secondary battery pack that is connected to the input/output terminal of the system from a second secondary battery pack to a first secondary battery pack in which voltage is higher than in the second secondary battery pack, causes the charge switch means of the second secondary battery pack to turn OFF the charging path that is in a state in which the current limiting means of said first secondary battery pack will cause a discharge operation to begin while limiting the flow of current.

The secondary battery pack of the present invention includes:

secondary batteries;

charge switch means that turns the charging path to the secondary batteries ON and OFF;

discharge switch means that turns the discharging path from the secondary batteries ON and OFF;

current-limiting means that causes the secondary batteries to discharge while limiting current to a fixed value or lower; and a control unit that controls the charge switch means, the discharge switch means, and the current-limiting means in accordance with instructions that are given.

BEST MODE FOR CARRYING OUT THE INVENTION

An embodiment for carrying out the present invention is next described with reference to the accompanying drawings.

Figure 1:
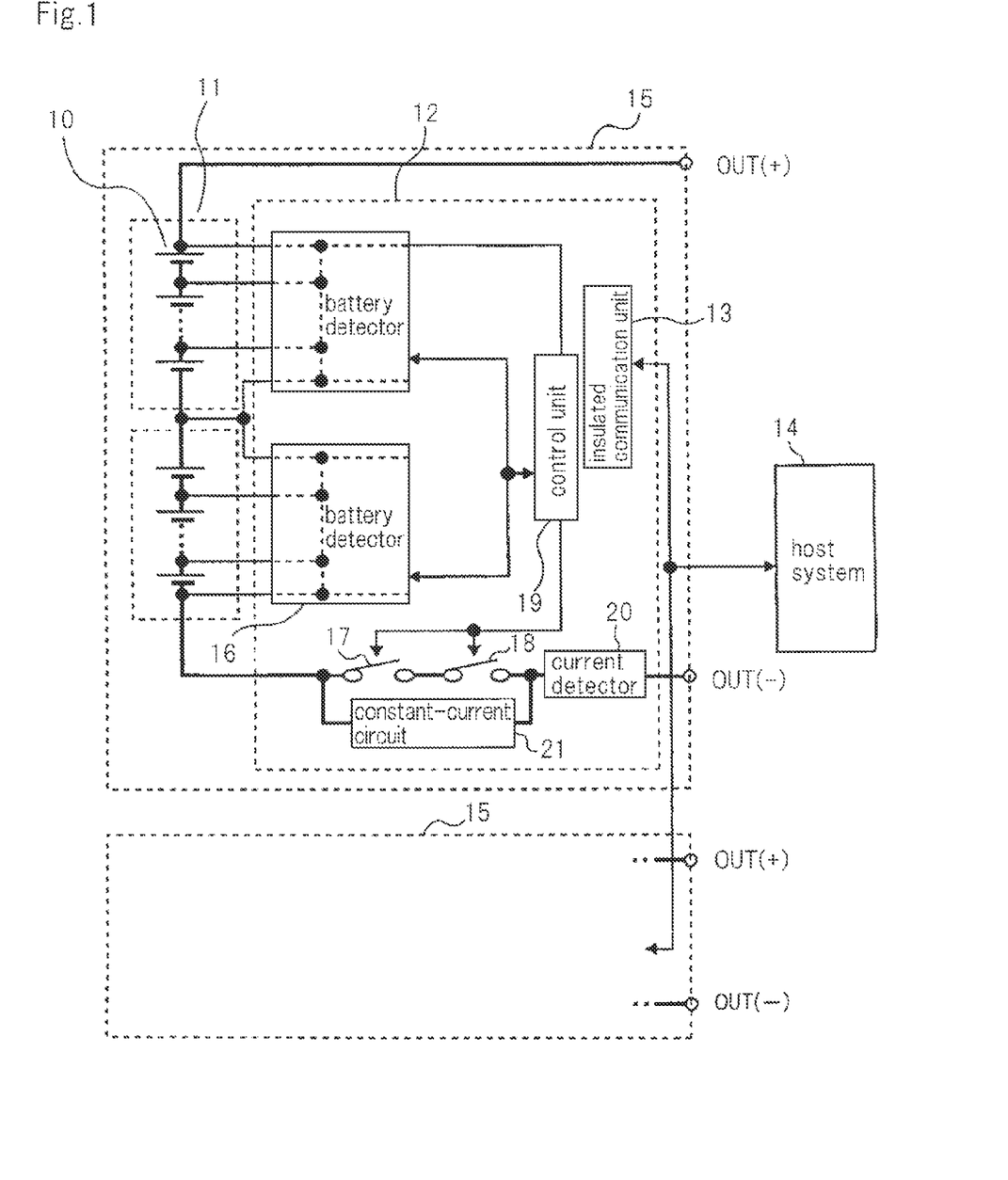
FIG. 1 is a block diagram showing the configuration of the power storage system according to the present exemplary embodiment.

FIG. 1 is a block diagram showing the configuration of the power storage system according to the present exemplary embodiment. Referring to FIG. 1, the power storage system has two secondary battery packs 15, and host system 14 that controls these secondary battery packs 15. The two secondary battery packs 15 are identical. In addition, although an example is shown in which there are two secondary battery packs 15, there may also be three or more secondary battery packs.

Two secondary battery packs 15 are arranged in parallel and are connected to a load (not shown). A power conditioner may be provided between secondary battery packs 15 and the load.

Secondary battery packs 15 have two secondary battery blocks 11 and control block 12. Secondary battery blocks 11 are of a configuration in which a plurality of secondary batteries are connected in series.

Control block 12 has two battery detectors 16, control unit 19, insulated communication unit 13, discharge switch 17, charge switch 18, current detector 20, and constant-current circuit 21.

Control unit 19 controls battery detector 16, charge switch 18, discharge switch 17, and constant-current circuit 21 based on instructions given from host system 14.

Two battery detectors 16 detect the two end voltages of each secondary battery 10 of two secondary battery blocks 11. Insulated communication unit 13 is a communication circuit for communication with host system 14 by control unit 19. Discharge switch 17 is a switch that turns the discharging path ON and OFF by control from control unit 19. Charge switch 18 is a switch that turns the charging path ON and OFF by control from control unit 19. Current detector 20 measures the discharge current or charge current of secondary battery pack 15. Constant-current circuit 21 is a circuit that causes secondary battery pack 15 to discharge while limiting the discharge current to a fixed value or less by control from control unit 19.

Host system 14 controls connections of secondary battery packs 15 to the load. For example, when host system 14 switches to secondary battery pack 15 that is connected to the load and in which the voltage is higher, from the other secondary battery pack 15 in which the capacity has dropped and in which voltage is low, host system 14 causes secondary battery pack 15 that is to be newly connected to begin discharging while limiting the current to no greater than a fixed value. At this time, constant-current circuit 21 in new secondary battery pack 15 turned ON.

Host system 14 next causes secondary battery pack 15 that is to be disconnected from the load to turn OFF the charging path. In secondary battery pack 15 that is to be disconnected from the load, charge switch 18 turns OFF the charging path. At this time, host system 14 further turns ON the discharging path of secondary battery pack 15 in which voltage is high at the same time as turning OFF the charging path of secondary battery pack 15 in which voltage is low and then turns OFF the discharging path of secondary battery pack 15 in which voltage is low.

Figure 2:
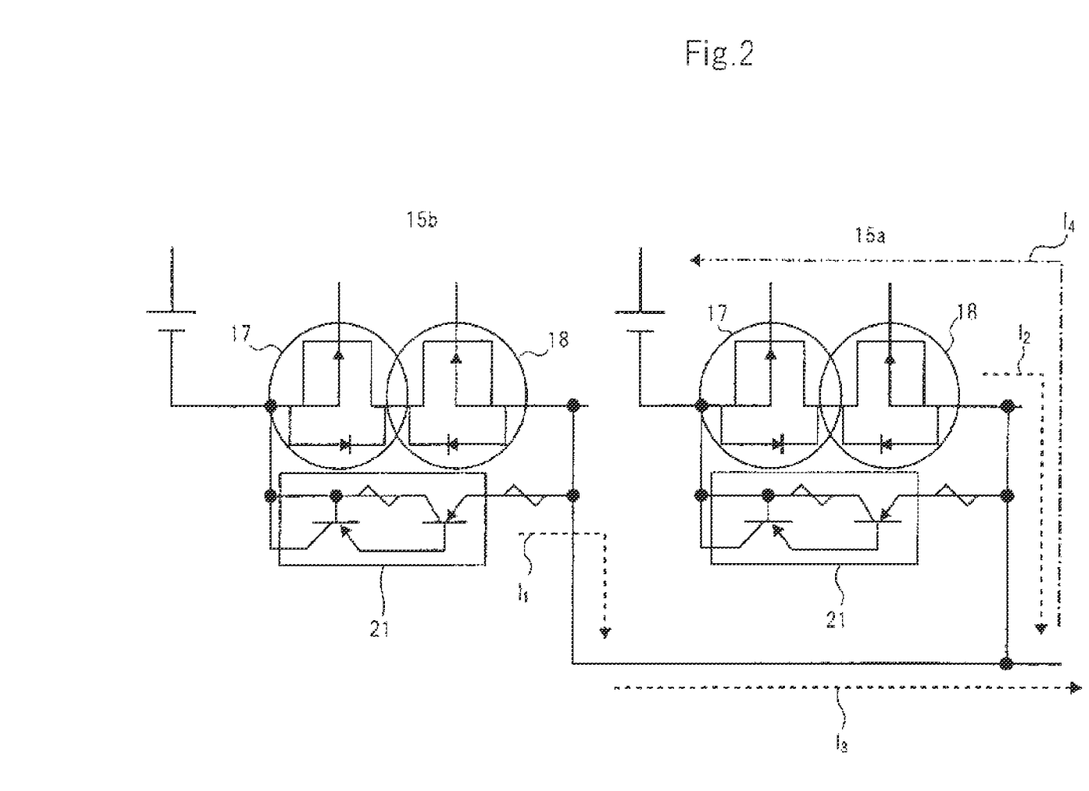
FIG. 2 is a view for describing the operation of the power storage system in the present exemplary embodiment when switching the secondary battery pack that is connected to load from secondary battery pack 15, in which the voltage is low, to secondary battery pack 15 in which the voltage is high.

FIG. 2 is a view for describing the operations of the power storage system in the present exemplary embodiment when switching the secondary battery pack that is connected to the load from secondary battery pack 15 in which voltage is low to secondary battery pack 15 in which voltage is high. FIG. 2 shows the portion of discharge switches 17, charge switches 18, and constant-current circuits 21 of two secondary battery packs 15 (low-voltage pack 15a and high-voltage pack 15b).

When switching from low-voltage pack 15a to high-voltage pack 15b, constant-current circuit 21 of high-voltage pack 15b first begins discharging while limiting the flow of current. At this time, current ($I_3$) in which the discharge current ($I_2$) from low-voltage pack 15a and the discharge current ($I_1$) in which the current is limited from high-voltage pack 15b are combined flows to the load. If the voltage difference of low-voltage pack 15a and high-voltage pack 15b is great, discharge current $I_1$ from high-voltage pack 15b flows to low-voltage pack 15a as charge current $I_4$. However, discharge current $I_1$ from high-voltage pack 15b is being controlled in a safe region and charge current $I_4$ that is greater than the predetermined value will not flow from high-voltage pack 15b to low-voltage pack 15a.

At the same time that charge switch 18 of low-voltage pack 15a turns OFF the charging path in this state, discharge switch 17 of high-voltage pack 15b turns ON the discharging path. Discharge switch 17 of low-voltage pack 15a next turns OFF the discharging path and causes constant-current circuit 21 of high-voltage pack 15b to halt discharge.

According to the present exemplary embodiment as described hereinabove, discharge starts from secondary battery pack 15 in which voltage is high and that is newly connected to the load while the current is controlled, and the charging path of secondary battery pack 15 in which voltage is low and that is to be disconnected from the load is turned OFF, whereby excess current or abnormal heat can be prevented even when there is a voltage difference between secondary battery packs 15, and the degree of freedom of operations relating to the connection of secondary battery packs 15 is improved.

Figure 3:
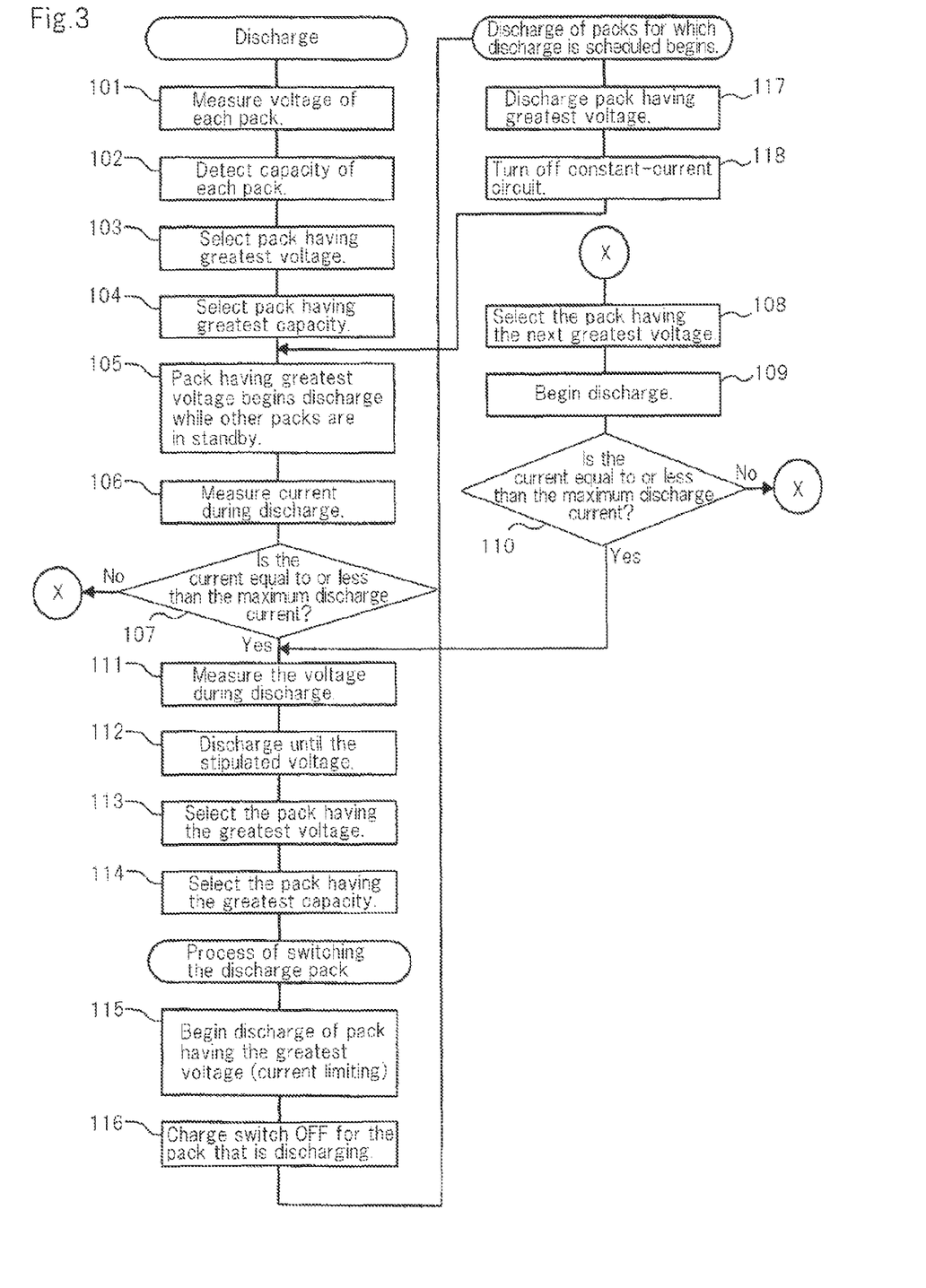
FIG. 3 is a flow chart showing the operations of the power storage system according to the present exemplary embodiment.

FIG. 3 is a flow chart showing the operations of the power storage system according to the present exemplary embodiment.

Although FIG. 1 and FIG. 2 show an example in which there are two secondary battery packs 15, FIG. 3 shows an example of a battery operations in which there are three or more secondary battery packs 15. More specifically, when the discharge current of secondary battery pack 15 that is discharging surpasses the maximum discharge current that is permitted to secondary battery pack 15 that is discharging, secondary battery pack 15 that is discharging is added and a process is carried out that limits the discharge current of each secondary battery pack 15 to the maximum discharge current or less.

Referring to FIG. 3, in a state in which none of secondary battery packs 15 is discharging, control unit 19 uses battery detector 16 to measure the voltage at the two ends of each secondary battery pack 15 and report the voltages to host system 14, and host system 14 finds the capacity of each secondary battery pack 15 based on the voltages that were reported and selects secondary battery pack 15 in which the voltage is greatest, i.e., in which the capacity is greatest (Steps 101-104). For example, a table showing the relation between voltage and capacity of secondary battery packs 15 is prepared in advance, and by referring to this table, the capacity of secondary battery packs can be obtained from the voltage at both ends. Discharge of secondary battery pack 15 in which voltage is greatest then begins (Step 105).

Control unit 19 uses current detector 20 to measure the current at the time of discharge of secondary battery pack 15 that is carrying out discharge (Step 106) and reports to host system 14. Host system 14 compares the value of the reported current with the maximum discharge current of secondary battery packs 15 (Step 107).

If the current value that was reported is greater than the maximum discharge current, host system 14 selects secondary battery pack 15 in which voltage is next greatest (Step 108) and causes discharge to begin (Step 109).

Host system 14 again compares the value of the current of secondary battery pack 15 that is discharging with the maximum discharge current (Step 110), and if the value of the current is greater than the maximum discharge current, returns to Step 108 and causes secondary battery pack 15 which has the next highest voltage to also discharge.

In Step 107, if the current value is equal to or less than the maximum discharge current, host system 14, while measuring the voltage at the time of discharge (Step 111), causes secondary battery pack 15 to discharge until the voltage value decreases to the stipulated voltage (Step 112). The stipulated voltage is a value that determines at what level of decrease in the capacity the secondary battery packs are switched, and this value may be freely set.

When the voltage of secondary battery pack 15 that is discharging decreases as far as the stipulated voltage, host system 14 selects secondary battery pack 15 in which the voltage is the greatest, i.e., in which the capacity is greatest, and begins the process of switching secondary battery pack 15 that is to begin discharging (Steps 113-114).

Host system 14 causes secondary battery pack 15 in which voltage is greatest (hereinbelow referred to as "new battery pack") to begin discharge by constant-current circuit 21 (Step 115). Host system 14 next turns OFF charge switch 18 of secondary battery pack 15 that is discharging and has been discharging to this point (hereinbelow referred to as "old battery pack") (Step 116). Host system 14 further causes discharge switch 17 of the new battery pack to turn ON and begin normal discharge (Step 117) and causes discharge by constant-current circuit 21 to halt (Step 118). Host system 14 then returns to Step 105 and continues the process.

If the value of the current falls to or below the maximum discharge current in Step 110, host system 14 carries out the processes that follow Step 111 while causing a plurality of secondary battery packs 15 to discharge in parallel.

Figure 4:
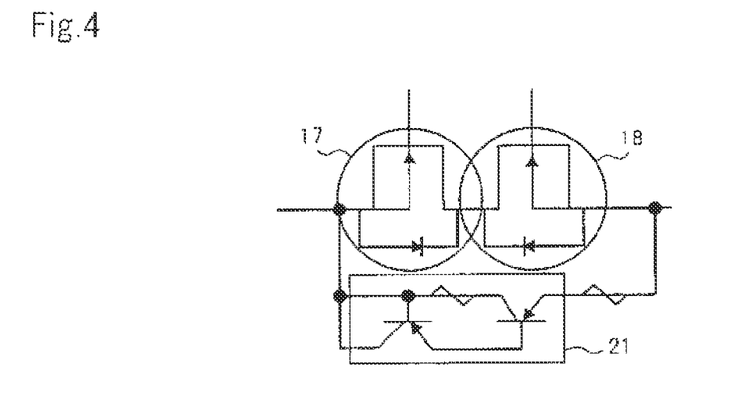
FIG. 4 is a circuit diagram showing an example of the actual circuits of discharge switch 17, charge switch 18, and constant-current circuit 21 of the power storage system according to the present exemplary embodiment.

FIG. 4 is a circuit diagram showing an example of the actual circuits of discharge switch 17, charge switch 18, and constant-current circuit 21 of the power storage system according to the present exemplary embodiment. Referring to FIG. 4, discharge switch 17 and charge switch 18 are made up by MOS transistors, and constant-current circuit 21 is made up of a bipolar current-mirror circuit. This circuit configuration allows the discharge current to be limited to no greater than a fixed value by a current-mirror circuit.

Figure 5:
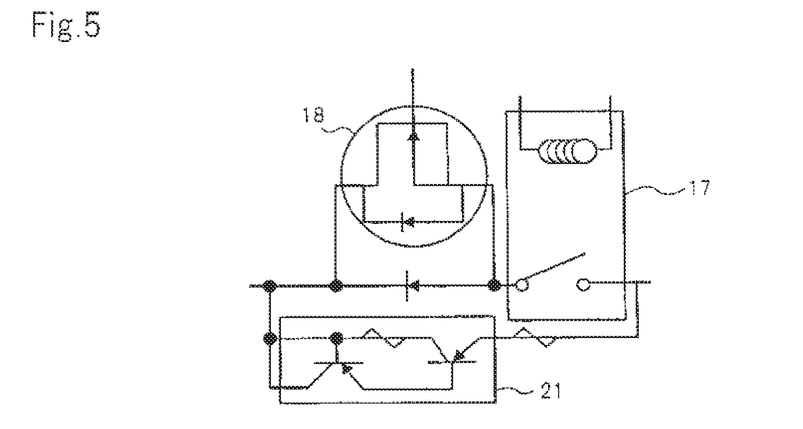
FIG. 5 is a circuit diagram showing another example of the actual circuits of discharge switch 17, charge switch 18, and constant-current circuit 21 of the power storage system according to the present exemplary embodiment.

FIG. 5 is a circuit diagram showing another example of the actual circuits of discharge switch 17, charge switch 18, and constant-current circuit 21 of the power storage according to the present exemplary embodiment. Referring to FIG. 5, charge switch 18 is made up of a MOS transistor, discharge switch 17 is made up of a relay circuit, and constant-current circuit 21 is made up of a bipolar current-mirror circuit. This circuit configuration allows the discharge current to be limited to no greater than a fixed value by a current-mirror circuit.

Figure 6:
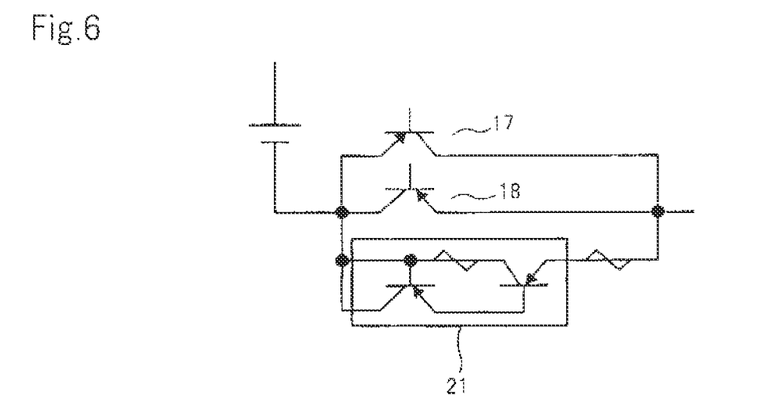
FIG. 6 is a circuit diagram showing another example of the actual circuits of discharge switch 17, charge switch 18, and constant-current circuit 21 of the power storage system according to the present exemplary embodiment.

FIG. 6 is a circuit diagram showing another example of the actual circuits of discharge switch 17, charge switch 18, and constant-current circuit 21 of the power storage system according to the present exemplary embodiment. Referring to FIG. 6, discharge switch 17 and charge switch 18 are made up of bipolar transistors and constant-current circuit 21 is made up of a bipolar current-mirror circuit. This circuit configuration allows the discharge current to be limited to no greater than a fixed value by a current-mirror circuit.

Figure 7:
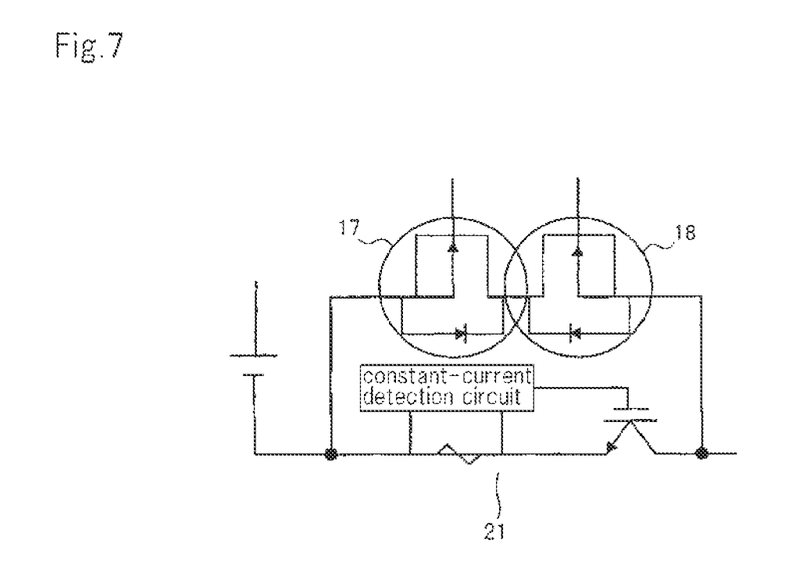
FIG. 7 is a circuit diagram showing an example of the actual circuits of discharge switch 17, charge switch 18, and constant-current circuit 21 of the power storage system according to the present exemplary embodiment.

FIG. 7 is a circuit diagram showing an example of the actual circuits of discharge switch 17, charge switch 18, and constant-current circuit 21 of the power storage system according to the present exemplary embodiment. Referring to FIG. 7, discharge switch 17 and charge switch 18 are made up of MOS transistors, and constant-current circuit 21 is made up of an IGBT (Insulated Gate Bipolar Transistor) that is a high-withstand element. This circuit configuration enables switching of secondary battery packs according to the present exemplary embodiment even when high-voltage secondary battery packs are used.

As described hereinabove, by limiting the current at the time of switching by a constant-current circuit, the present exemplary embodiment enables safe switching of secondary battery packs and allows two secondary battery packs to be used alternately or three or more secondary battery packs to be used in order.

The present exemplary embodiment further enables safe switching and the use of high-capacity, high-output, and inexpensive secondary batteries such as lithium-ion secondary batteries for use in, for example, EVs.

An actual working example realized by the present exemplary embodiment is next described.

As an example, it will be assumed that the difference in the capacity of two secondary battery packs 15 of the present exemplary embodiment is 30% and that the voltage of one secondary battery 10 is 4.2 V and the other secondary battery 10 at this time is 3.7 V. It will be further assumed that 100 secondary batteries 10 are used connected in a series. In this case, the voltage difference of secondary batteries 10 when the difference in capacity is 30% is (4.2 V-3.7 V)=0.5 V. One hundred secondary batteries 10 are connected in series, and the voltage difference of secondary battery pack 15 is therefore 0.5 V×100=50 V. When the stipulated resistance value of secondary battery pack 15 is 40 mΩ, the current that flows among secondary battery packs 15 is 1250 A.

On the other hand, if it is assumed that the maximum current when charging secondary battery packs 15 with a 30-Ah capacity is 90 A 3C, the charge current that flows between secondary battery packs 15 at the time of switching must be limited to 90 A or less. As a result, constant-current circuit 21 should be configured to limit the current to, for example, 80 A or less.

Alternatively, a case is considered in which a 100-KWh power storage system of 30-Ah secondary battery packs 15 is realized by connecting secondary battery packs 15 in parallel. A 400-V-600-V system is assumed as the typical voltage. If the average voltage is assumed to be 370 V, the capacity of the power storage system will be 100 KWh/370 V=270 Ah. Assuming secondary battery packs 15 of 30 Ah capacity, a power storage system can be realized by 270 Ah/30 Ah=8 rows. If a power storage system is configured by secondary battery packs 15 in parallel in this way, secondary battery packs 15 can be individually disconnected and exchanged, and the number of secondary battery packs 15 can be increased.

In addition, host system 14 and its operations and control unit 19 and its operations in the present exemplary embodiment may be realized by causing a computer to execute a software program that has been recorded on a recording medium.

Although the present invention has been described with reference to an exemplary embodiment, the present invention is not limited to the exemplary embodiment. The configuration and details of the present invention that are defined in the claims are open to various modifications within the scope of the invention that will be clear to one of ordinary skill in the art.

This application claims the benefits of priority based on Japanese Patent Application No. 2010-173463 for which application was submitted on Aug. 2, 2010 and incorporates by citation all of the disclosures of these applications.

What is claimed is:

1. A power storage system comprising:
   a plurality of secondary battery packs;
   an input/output terminal with which said plurality of secondary battery packs are connected in parallel; and
   a host device;
   wherein said plurality of secondary battery packs each comprise:
      secondary batteries;
      charge switch means that turns a charge current that flows along a charging path of said secondary batteries ON and OFF;
      discharge switch means that turns a discharge current that flows along a discharging path of said secondary batteries ON and OFF;
      current-limiting means that limits said discharge current to a fixed value or lower; and
      a control unit that controls said charge switch means and said discharge switch means;
   wherein said host device, when switching from a second secondary battery pack that is connected to the input/output terminals of the system to a first secondary battery pack in which voltage is higher than in said second secondary battery pack, causes the charge switch means of said second secondary battery pack to turn OFF the charging current in a state in which the current limiting means and the discharge switch means of said first secondary battery pack will cause a discharge operation to begin while limiting the flow of current.

2. The power storage system as set forth in claim 1, wherein said host device causes the discharge switch means of said first secondary battery pack to turn ON the discharging current at the same time as causing the charge switch means of said second secondary battery pack to turn OFF the charging current, and next causes the discharge means of said second secondary battery pack to turn OFF the discharging current and causes said discharge switch means of said first secondary battery pack to turn OFF the discharge current.

3. The power storage system as set forth in claim 1, wherein said current-limiting means comprises a constant-current circuit that is connected in parallel with the discharging path by means of said discharge switch means.

4. The power storage system as set forth in claim 3, wherein said constant-current circuit comprises a current-mirror circuit realized by a bipolar transistor.

5. The power storage system as set forth in claim 4, wherein said charge switch means and said discharge switch means each comprise a MOS transistor, wherein said charge switch means and said discharge switch means are connected together in series.

6. The power storage system as set forth in claim 4, wherein said charge switch means and said discharge switch means each comprise a bipolar transistor, wherein said charge switch means and said discharge switch means are connected together in parallel.

7. The power storage system as set forth in claim 4, wherein said discharge switch means comprises a relay circuit.

8. The power storage system as set forth in claim 3, wherein said constant-current circuit comprises an insulated gate bipolar transistor (IGBT) circuit.

9. The power storage system as set forth in claim 8, wherein said charge switch means and said discharge switch means each comprise a MOS transistor, wherein said charge switch means and said discharge switch means are connected together in series.

10. The power storage system as set forth in claim 8, wherein said charge switch means and said discharge switch means each comprise a bipolar transistor, wherein said charge switch means and said discharge switch means are connected together in parallel.

11. The power storage system as set forth in claim 8, wherein said discharge switch means comprises a relay circuit.

12. The power storage system as set forth in claim 3, wherein said charge switch means and said discharge switch means each comprise a MOS transistor, wherein said charge switch means and said discharge switch means are connected together in series.

13. The power storage system as set forth in claim 3, wherein said charge switch means and said discharge switch means each comprise a bipolar transistor, wherein said charge switch means and said discharge switch means are connected together in parallel.

14. The power storage system as set forth in claim 3, wherein said charge switch means and said discharge switch means each comprise a bipolar transistor, wherein said charge switch means and said discharge switch means are connected together in parallel.

15. The power storage system as set forth in claim 3, wherein said discharge switch means comprises a relay circuit.

16. The power storage system as set forth in claim 3, wherein said discharge switch means comprises a relay circuit.

17. The power storage system as set forth in claim 1, wherein said charge switch means and said discharge switch means each comprise a MOS transistor, wherein said charge switch means and said discharge switch means are connected together in series.

* * * * *